United States Patent
Newth

(10) Patent No.: US 10,288,123 B2
(45) Date of Patent: May 14, 2019

(54) SHAFT COUPLER

(71) Applicant: Gregory Lee Newth, Montague, MA (US)

(72) Inventor: Gregory Lee Newth, Montague, MA (US)

(*) Notice: Subject to any disclaimer, the term of this patent is extended or adjusted under 35 U.S.C. 154(b) by 407 days.

(21) Appl. No.: 14/810,172

(22) Filed: Jul. 27, 2015

(65) Prior Publication Data

US 2016/0348730 A1 Dec. 1, 2016

Related U.S. Application Data

(60) Provisional application No. 61/998,357, filed on Jun. 26, 2014, provisional application No. 62/066,561, filed on Oct. 21, 2014.

(51) Int. Cl.
| | |
|---|---|
| *F16D 1/108* | (2006.01) |
| *F16B 7/04* | (2006.01) |
| *F16D 1/112* | (2006.01) |

(52) U.S. Cl.
CPC .............. *F16D 1/108* (2013.01); *F16B 7/042* (2013.01); *F16D 1/112* (2013.01); *Y10T 403/32483* (2015.01); *Y10T 403/604* (2015.01)

(58) Field of Classification Search
CPC .......... F16D 1/108; F16D 1/112; F16B 7/042; F16B 7/105; Y10T 403/32483; Y10T 403/604; Y10T 403/32475
See application file for complete search history.

(56) References Cited

U.S. PATENT DOCUMENTS

| | | | | |
|---|---|---|---|---|
| 2,473,388 A | * | 6/1949 | Rambo | E21B 17/046 182/178.6 |
| 2,474,360 A | * | 6/1949 | Jimerson | B25B 23/0035 279/76 |
| 2,639,379 A | | 4/1952 | Rath | |
| 2,980,456 A | | 4/1961 | McMullin | |
| 4,079,978 A | * | 3/1978 | McMullin | F16B 7/105 15/3.51 |
| 4,385,849 A | | 5/1983 | Crain | |
| 4,508,468 A | | 4/1985 | Irwin | |
| 4,595,383 A | | 6/1986 | Nienhaus | |
| 5,083,883 A | | 1/1992 | Ueda | |
| 5,255,993 A | | 10/1993 | Kovacs | |
| 5,593,196 A | | 1/1997 | Baum | |

(Continued)

FOREIGN PATENT DOCUMENTS

WO WO-2014201007 A1 * 12/2014 ............. F16D 1/112

OTHER PUBLICATIONS

International Searching Authority ISA/US PCT "Search Report" dated Oct. 20, 2015 11 Pages.

*Primary Examiner* — Matthew R McMahon
(74) *Attorney, Agent, or Firm* — C. Nessler

(57) ABSTRACT

A coupler for connecting two segments of a shaft comprises a first fitting and a second fitting, each of what is attachable to the end of a shaft segment. The first fitting has at least one spring loaded button. The first fitting is received within the cavity of the second fitting. A coupler button has a recess in the base for receiving a spring and there are planar button-guiding surfaces within the first fitting. The second fitting preferably has one or more exterior surface flats which align with the direction of button movement and which mate with one or more flats within of the second fitting cavity.

18 Claims, 6 Drawing Sheets

(56) References Cited

U.S. PATENT DOCUMENTS

| | | |
|---|---|---|
| 6,688,800 B2 | 2/2004 | Kresge |
| 7,967,259 B2* | 6/2011 | Nakatani ................. F16B 7/042 248/125.8 |
| 8,007,196 B2* | 8/2011 | Whitling ................. F16B 7/042 403/109.1 |
| 8,123,428 B2* | 2/2012 | Wareham ................. F16B 7/042 248/188.5 |
| 8,485,751 B2* | 7/2013 | Vetesnik ................. F16B 7/105 403/109.1 |
| 8,926,214 B2 | 1/2015 | Lah |
| 2002/0164205 A1 | 11/2002 | Kresge |
| 2007/0017072 A1* | 1/2007 | Serio ........................ A47L 13/42 24/573.11 |
| 2008/0089740 A1* | 4/2008 | Cirio .................... F16D 1/0894 403/373 |
| 2010/0054852 A1 | 3/2010 | Snyder |
| 2010/0122718 A1* | 5/2010 | Lah .......................... A45B 9/00 135/75 |
| 2012/0201597 A1* | 8/2012 | Comerford ............. E04C 5/165 403/306 |
| 2013/0236237 A1* | 9/2013 | Schmidt ................. F16B 7/042 403/109.3 |
| 2014/0290034 A1 | 10/2014 | Vetesnik |
| 2015/0300415 A1 | 10/2015 | Russell |
| 2016/0138631 A1 | 5/2016 | Kresge |

\* cited by examiner

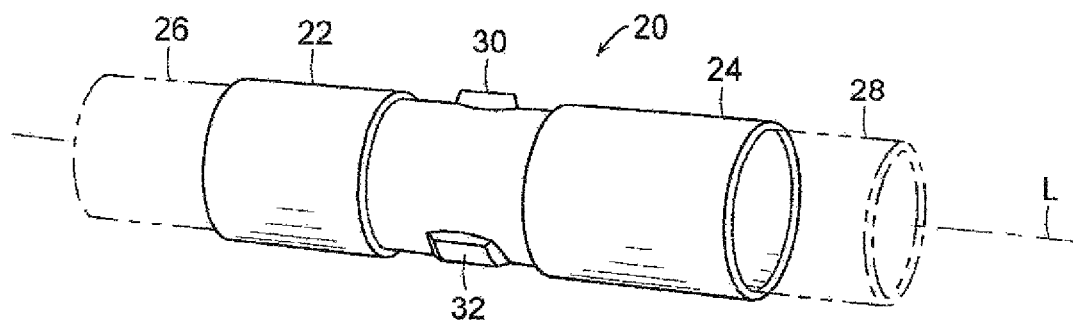
FIG. 1
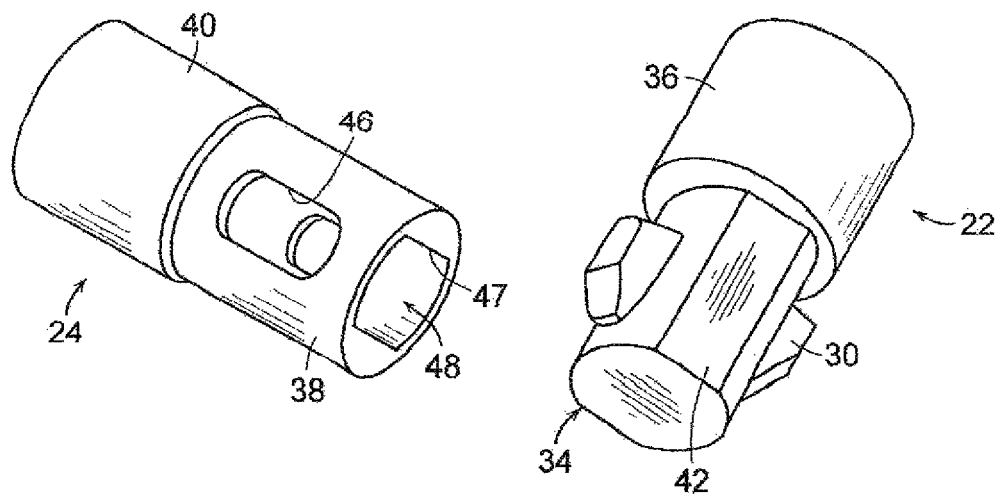
FIG. 2
FIG. 3

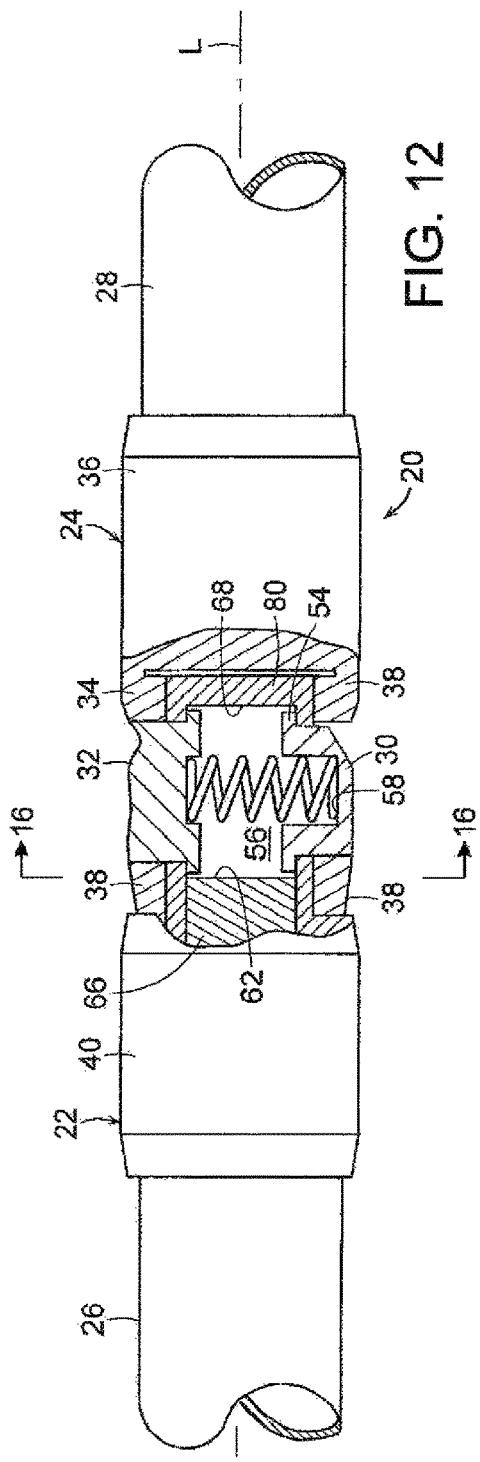
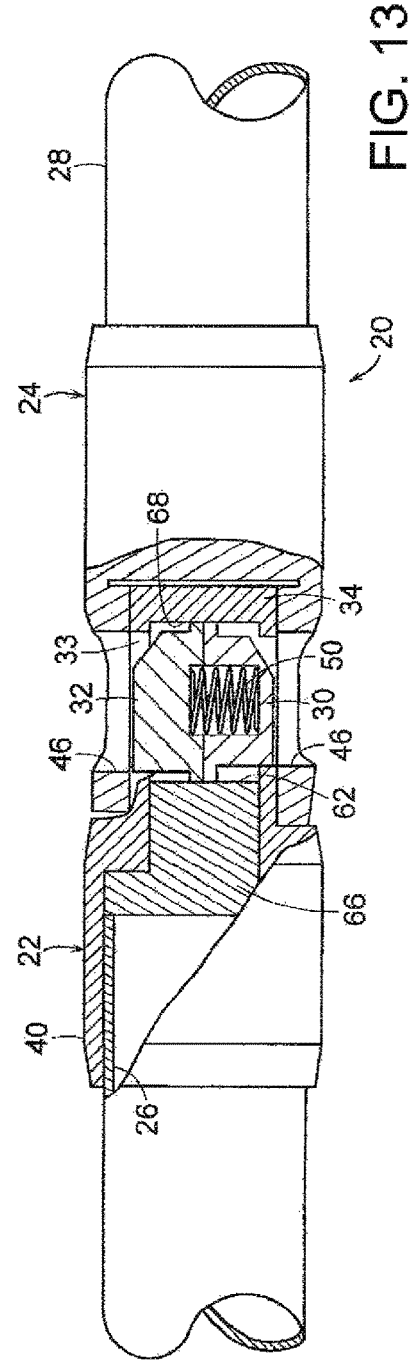

SHAFT COUPLER

This application claims benefit of provisional patent application Ser. No. 61/998,357, filed Jul. 26, 2014 and provisional patent application Ser. No. 62/066,561, filed Oct. 21, 2014, the disclosures of both of which are hereby incorporated by reference in their entireties.

TECHNICAL FIELD

The present invention relates to disengageable couplers, useful for shafts that transmit linear and rotary motion.

BACKGROUND OF INVENTION

Persons engaged in maintenance and repair of chimneys and other pipes and ducts have long used shafts, also called poles, comprised of coupled-together shaft segments, for a variety of applications. Shafts are provided in short sections to enable easy transport between jobs.

In one use, a mechanic uses tool such as a brush or a lifting device of the kind described in U.S. Pat. No. 9,027,977. The tool is attached to the end of a shaft and lowered into the chimney interior, which may be straight or crooked. In another use, a mechanic puts a flail-like cleaning tool on the shaft and inserts it into the lower part of a chimney or stovepipe, using a power tool to rotate the tool as it moves upwardly. In another use, a mechanic puts a flail or brush on the end of a shaft and runs it along an air duct or pipe, some of which have rather small diameters compared to a typical chimney, to remove deposits.

The prior art uses require good fit and stiffness of a shaft coupler. As a result, the shaft, and therefore, the coupler of the shaft segments, can be subjected to substantial torsional and longitudinal forces. Insofar as practical, it is desirable that a shaft comprised of segments behave as if it was a unitary structure.

Particularly during the course of chimney work it is common that soot deposits, masonry particulate, and other debris are agitated within the chimney and thus will contact any coupling. The coupling may also be subjected to water wetting during handling and use. Similar dirt and debris problems can be present during other uses.

Various kinds of couplers have been used to interconnect shaft pieces in the past. A familiar kind of prior art coupler comprises a male part and a female part: the male part has a spring loaded, radially-moving plunger (also called a button) which engages a hole or cutout in a mating female part, thereby to lock the two parts together. Generally, there has been a tendency for the plungers of prior art couplers to stick when being engaged, or insufficiently to resist unwanted disengagement, especially as wear of the coupler occurs over time.

U.S. Pat. No. 6,688,800 of Kresge describes a coupler which comprises a single snap-like plunger lock. UK Pat. 2500288 and UK Patent Application GB2509004, both of Russell, describe other couplers having single buttons.

A good coupler must be able to function well in engage and disengage in dirty environments, and resist inadvertent disengagement. Engagement and disengagement of a coupler—even when small in diameter, will desirably be easy, including for a person wearing gloves. A coupler should be strong in resisting forces in longitudinal shaft directions, and in torsional directions. A desirable coupler will have a plunger which will not twist or jamb, and which will function properly even if it becomes worn. Generally, it is hard, when a coupler is small in diameter to make a coupler which is strong, easy to engage and disengage, and durable. As described below, the present invention lends itself to small size coupler.

BRIEF DESCRIPTION OF DRAWINGS

FIG. 1 is a perspective view of a coupler comprised of two fittings mated with each other.

FIG. 2 is a perspective side view of one of the fittings shown in FIG. 1.

FIG. 3 is a perspective view of the second of the fittings shown in FIG. 1.

FIG. 12 is a lengthwise view, with a partial cross section, of the coupling shown in FIG. 1 along with parts of shafts which are connected by the coupling.

FIG. 13 is a view like that of FIG. 12, showing the buttons in depressed condition, so the two parts of the coupling might be disengaged by pulling them apart.

SUMMARY

Figure 4:
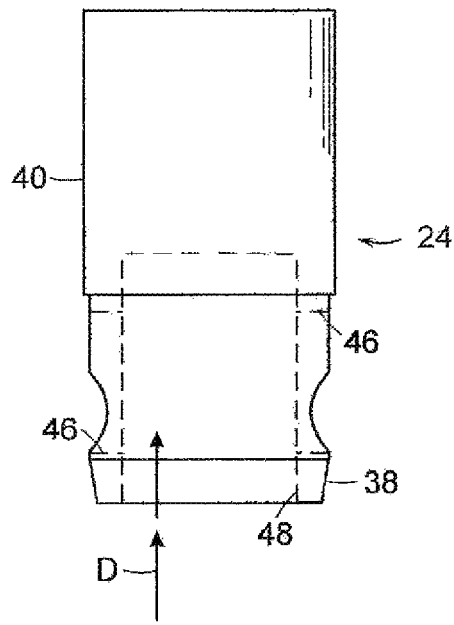
FIG. 4 is a side view of the fitting shown in FIG. 2.

An object of the present invention is to provide a coupler for two shaft segments which overcome the drawbacks and satisfy the needs mentioned in the Background, including being useful when the coupler is small in diametrical dimension. A further object is to provide a coupler which has good longitudinal strength, good rotational strength, and good stiffness. A still further object is to provide a coupler with easy engagement, with resistance to unwanted disengagement, and with resistance to jamming that prevents disengagement, even when the coupler is coated with debris or worn.

In accord with the invention, a coupler preferably has two opposing side buttons. For smaller couplers particularly, the coupler may have one button. An embodiment of coupler comprises a first fitting and a second fitting. The first fitting has a proximal end shaped for attachment to a shaft piece, and an opposing distal end which is also called the male end. There is least one, preferably two, oblong buttons, are captured within a cavity of the distal end of the first fitting. The button(s) move outwardly under action of a compression spring which presses against the base of the button. The spring is at least partially within a cavity at the base of the button. Preferably, the spring is a coil spring which, if compressed fully, substantially fits within a cavity at the base of a button. When there are two buttons, only one button has said deep cavity for receiving the spring; the other button may have a small recess.

The second fitting of the coupler has a proximal end shaped for attachment to a second shaft piece, and a distal end, also called the female end, having a cavity with a lengthwise opening shaped to fit the male end of the first fitting, preferably with anti-rotation features such as one or more mating flats. When the fittings are mated, a spring within the first fitting urges the button(s) outwardly into an opening in the side of the cavity of the female end of the second fitting.

Each button is captured within the cavity of the male end of the first fitting by proximal and distal flanges. In preferred embodiments, the lengthwise end of each flange bears against a transverse planar surface within the cavity. And each button has opposing lengthwise planar sides which mate with opposing side planar surfaces within the cavity; those planar surfaces are parallel to the one or more flats on the exterior of the fitting. Thus the buttons have good resistance to torsional forces and lengthwise forces, in either direction.

In further accord with the invention, the first fitting has a cavity which has a wall at the distal end and an opening at the proximal end. The button(s) are inserted into the cavity with the spring compressed partially or wholly within the cavity in the base of the button. After the button(s) are put in position, a plug is inserted into the proximal end of the cavity to provide a transverse planar surface which guides the proximal end of the flange of the button.

A coupler of the present invention achieves the objects of the invention, and in particular, it is strong in resisting torsional and lengthwise forces, and is resistant to inadvertent disengagement due to the superior outward thrusting of button(s) by a large spring, which the invention enables. The coupler works reliably under adverse use conditions.

The foregoing and other features and advantages will be fully appreciated from the more detail description which follows and the associated drawings.

Description

With reference to FIG. 1-3, an embodiment of coupler 20 comprises a first fitting 22 and a second fitting 24. The fittings are mated in FIG. 1, to form the coupler 20 that connects two shaft segments shown in phantom. The fittings are shown separately in FIG. 2 and FIG. 3. The coupler, and each portion or part thereof, has a length which lies along axis L. The coupler is preferably made of steel having a corrosion resisting plating, but may be made of other materials including stainless steel, aluminum and strong plastic.

The portion of each fitting 34, 38 which is furthest from a shaft being coupled is called the distal end. The distal ends those which engage each other when the fittings are mated. The proximal end of each fitting is that end which is furthest from the mating location. Because of how the distal ends mate, sometimes the first fitting is referred to as the male fitting having a male stub end, and the second fitting is referred to as the female fitting having a female stub end.

The first fitting 22 has a distal end 34 and an opposing proximal end 36 which is preferably cylindrical and which is shaped for attachment to the end of a shaft segment 26 shown in phantom in FIG. 1. The second fitting 24 has a distal end 38 with a cavity 48 shaped for receiving the male stub (distal) end 34 of the first fitting. The opposing (proximal) end 40 of second fitting 24 is shaped for attachment to the end of a shaft segment 28, shown in phantom in FIG. 1.

Figure 5:
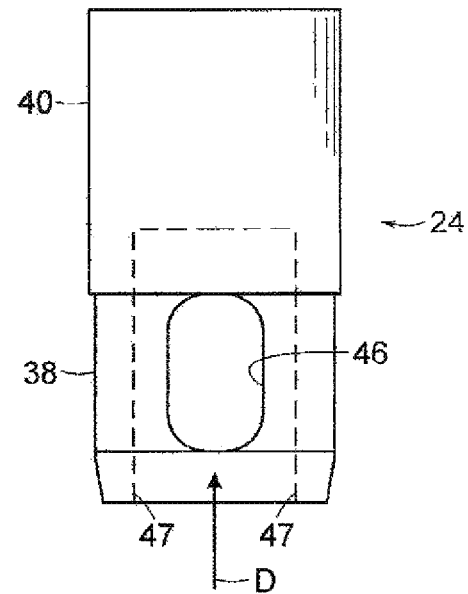
FIG. 5 is a side view of the fitting shown in FIG. 2 which is at a 90 degree angle to the view of FIG. 4.
Figure 6:
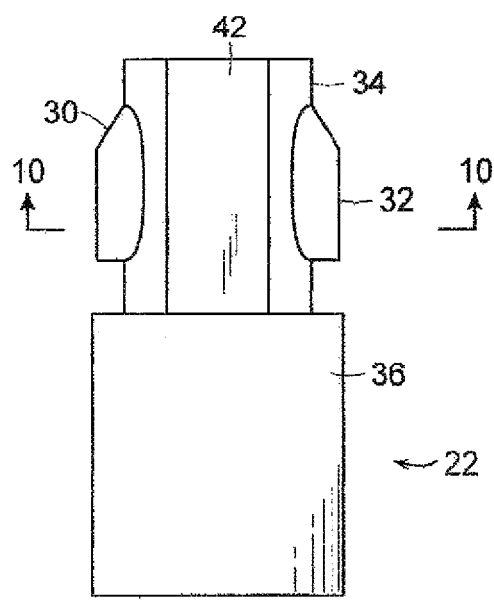
FIG. 6 is a side view of the fitting shown in FIG. 3.
Figure 7:
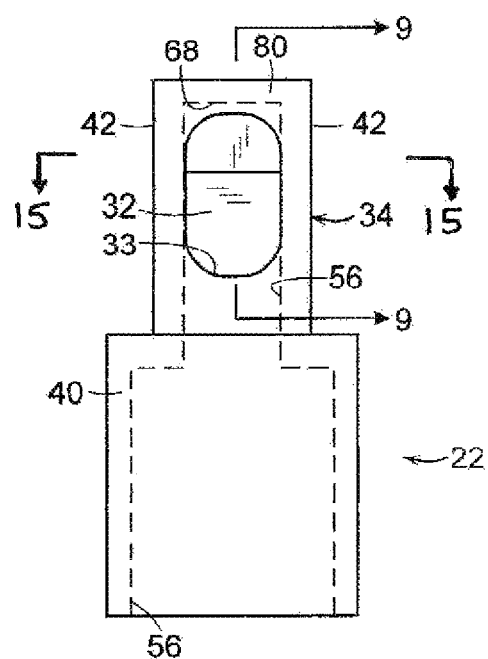
FIG. 7 is a side view of the fitting shown in FIG. 3 which is at a 90 degree angle to the view of FIG. 6.

FIG. 4 and FIG. 5 respectively show fitting 24 in a first side view and a second side view in which the fitting is rotated 90 degrees. FIG. 6 and FIG. 7 show fitting 22 in the same respective ways. The arrows D show how the fittings mate with each other.

Referring to FIG. 1-7 hereafter, the distal end of first fitting 22 is partly cylindrical, having opposing side external flat surfaces (flats) 42 which mate with flats 47 that are within the cavity 48 of the female stub end 38 of second fitting 24.

Two opposing side buttons (plungers) 30, 32 are captured within the distal end of the first fitting 22. A spring 50, described below, urges the buttons outwardly. When the fittings are mated/engaged with each other to form coupler 20 as shown in FIG. 1, the buttons extend outwardly through openings 33 in the circumferential wall of distal end 34 and through the openings 46 in the wall of distal end 38 of fitting 24. And until pressed manually inward against the force of the spring, the buttons prevent the bodies 22, 24 from disengaging. The buttons also will prevent the fittings from rotating relative to each other, if flats 42, 47 are not present. As described below in connection with FIG. 15 and FIG. 16, the buttons advantageously set within the openings 46 so they have full engagement with fitting 24.

Two diametrically opposed openings 46 connect the exterior of the fitting 24 to cavity 48 that is the interior of the sleeve-like end 38. The openings 46 are oblong and have parallel lengthwise sides that are continuations of planar surfaces 44 which are inside cavity 48. Cavity 48 is preferably a blind hole with an opening at the proximal end of the fitting, as shown, for reasons given below; alternatively cavity 48 may be a through hole. The exterior surface of fitting 24 around the opening 46 is preferably scalloped, to facilitate manual inward pressing of the buttons. A preferred scallop has a depth which is half the wall thickness of end 38 and extends along half the length of an opening 46. Particularly when a coupling is large in diameter, scallops might be omitted.

Figure 8:
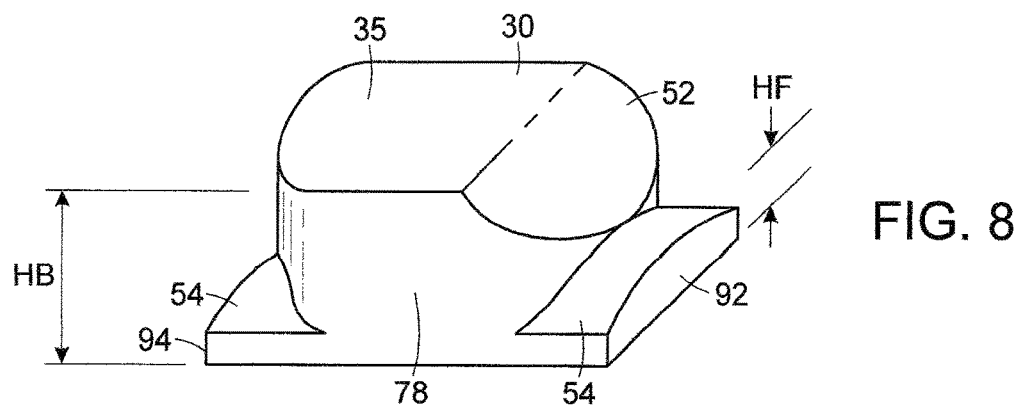
FIG. 8 is a perspective view of a button.

FIG. 8 shows the exterior of a typical button 30. The button has a bevel 52 at one end, as also shown in FIG. 3 and FIG. 6. The bevel faces in the distal direction so it facilitates the engagement of the fittings 22, 24 by lengthwise thrusting without requiring manual pressing of the buttons. In other embodiments, the bevel may be omitted. Button 30 is shown with a flat top 35. In other embodiments, a button may have a curved top. Engagement of the flats 42, 47 prevent relative rotation of the mated fittings.

In alternative embodiments of the invention only one flat on each fitting may be used. Other constructions which achieve the same lengthwise anti-rotation feature as do the flats may be used. For example, the male stub of fitting 22 may comprise a polygon cross section, or splines, or a raised lengthwise key, and the cavity of female end 38 of fitting 24 will be reciprocally shaped. In still the other embodiments of the invention, where having the best torsional strength is less of an issue, the end 34 and cavity 48 may be wholly cylindrical and rotation would be resisted only by the buttons.

From the Background, it will be appreciated that close tolerance fit between the mating parts of the fittings is undesirable because debris deposited in the course of chimney work could cause jamming. Since there is as a result some torsional "slop" between the mated fittings, there can be some lateral (torsional direction) force applied to the buttons. As described below a fitting of the present invention has features which provide good button function, even in such case.

The following are aims for couplers of the present invention. Buttons should project sufficient from the exterior surface of the male stub to engage well the sleeve of the female fitting, and should have a size sufficient for easy manipulation by a user's fingers. That suggests that the buttons be large. The buttons must move easily during in-out motion; and enabling the buttons to thrust outwardly with enough force to overcome debris when it is present. That suggests a large spring. On the other hand, a coupling should be small, for small size shafts, and for economic manufacturing, the buttons should be small so that they can be inserted within the interior cavity of a fitting. It will be appreciated that there is a competition amongst these goals; achieving them becomes more difficult in smaller diameter couplers and has required work and experiment.

To summarize, a preferred two-button coupler of the present invention has advantageous features which may be used singly or in various combinations; they include:

(a) The spring is positioned within a pocket in one button; and there is preferably a recess in the other button. Preferably, the button pocket and spring are sized so, when compressed, the whole of the spring substantially fits within the pocket.

(b) The cavity of the fitting within which the buttons move in-out has opposing side lengthwise-running planar surfaces (flats) which mate with planar surfaces on the lengthwise sides of the buttons. The internal flats are parallel to the flats on the exterior of the male stub when such male stub flats are present.

(c) The buttons have substantial flanges only at the ends, for retaining the buttons within the cavity of a fitting, while the sides of the buttons are planar. Thus the sides of the buttons are guided well by the lengthwise planar surfaces within the cavity of the male stub in cooperation with the lengthwise edges of the openings through which the buttons move in and out. This provides the buttons with resistance to twisting and jamming.

(d) The lengthwise flange ends of the buttons have thick areas which are guided at one end by a distal end wall of the fitting, and at the other end by a plug set within the proximal end of the interior cavity. This enables the buttons to resist lengthwise forces and move smoothly in presence of debris or a light load.

(e) The male end of one fitting has opposing exterior parallel planar flat sides that mate with flats within the cavity of the mating female fitting. At the same time, the direction of motion of the buttons is parallel to the planes of the exterior flats. Thus, the interior flats are parallel to the exterior flats. This provides both resistance to torque and buttons having a larger height than otherwise.

Returning again to the details of coupling 20, fitting 22 has an interior cavity 56 which is preferably a blind hole, as shown in FIG. 6-7, since the wall which closes the distal end of the cavity provides a benefit with respect the in-out sliding motion of the buttons, as described further below.

Buttons 30, 32 are thrust outwardly through opposing side openings 33 in distal end 34 of fitting 22 by captured spring 50; and they may be pushed inwardly by a user's fingers. The buttons and mating parts have several distinct features, which enable the buttons to have good height HB which imparts resistance to the disruptive effect of torsional forces on the buttons.

Figure 9:
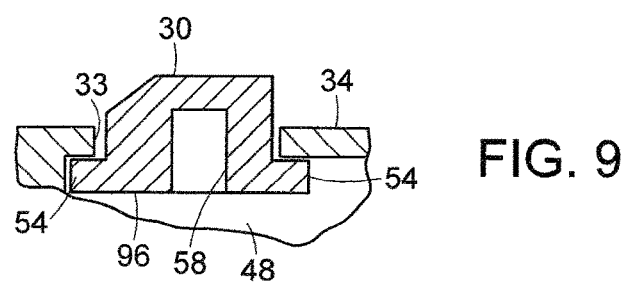
FIG. 9 is a partial cross section showing how a button fits within the end of a fitting like that shown in FIG. 3.

Each preferred button 30, 32 preferably is substantially the same shape, except for the preferred difference with respect to a cavity or cavities, for receiving a spring. Referring to FIG. 8 and FIG. 9, typical button 30 has opposing end flanges 54 which have preferably curved surfaces, adapted for fitting against the interior surface of the wall of end 34 that defines cavity 56. FIG. 9 is a cross section of the end 34 of fitting 22 and shows how flanges 54 keep the button from escaping cavity 56 of end 34 through opening 33. FIG. 8 shows that typical button 30 has a height HB that is measured where the top intersects the lengthwise side edge. A button may have a curved top, along with the preferred bevel at one end. Button 30 has a flat bottom surface 96 that maximizes the height of cavity 58 into which spring 50 fits. The flat bottom surface also maximizes the height HF of the flange ends 92, 94, and thus the area of distal and proximal flange ends, which aids in resisting lengthwise thrust in either direction and provides good in-out motion of a button. See further description below.

Figure 10:
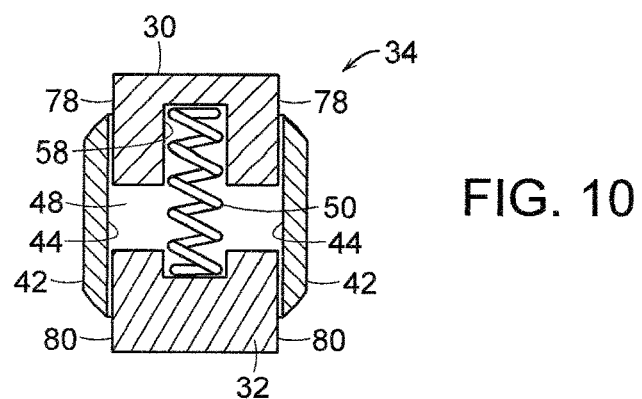
FIG. 10 is a transverse cross section of the fitting shown in FIG. 6, showing the buttons and spring.

The cross section of FIG. 10 shows that each button 30, 32 respectively has opposing lengthwise planar sides 78, 80 that extend from the base to the top. The planar sides 78, 80 mate with, and slide in and out along, the planar surfaces of opposing side flats 44 which comprise the surface of the wall within cavity 48. Such engagement of button surfaces and cavity interior surfaces provides the buttons with good resistance to jamming where there is side load, such as might result from the torsional forces and slop mentioned above. See also the description related to FIG. 15 and FIG. 16.

FIG. 10 also shows that flats 44 on the interior cavity of end 34 are parallel to flats 42 on the exterior surface of end 34. That feature enables the interior flats 44 to be of greater height (as portrayed in FIG. 10) than they could have been, if the interior cavity and the motion of the buttons was alternatively in the direction of the flat surfaces 42, i.e., if the motion was left-right in FIG. 10. This feature is particularly useful in small diameter couplings.

Coil spring 50 has a variable length; in use it is compressed between the buttons and presses the bases of each button outwardly to the maximum permitted by the flanges, as shown in FIG. 10, so they can pass into openings 46 of the wall of the female cavity end of mated fitting 24. When the buttons are pressed inwardly, they compress the spring.

Spring 50 sets within the deep cylindrical cavity 58 of button 30; the cavity is preferably of sufficient depth to receive the whole, or at least substantially the whole (90% or more), of the length of spring 50 when the spring is compressed. As described below, this enables having buttons with exceptionally good height to be positioned within a small fitting 22, while at the same time it enables having a spring which has adequate size and gage to make the buttons "snap" outwardly, even in the presence of debris.

Button 32 preferably has a shallow cylindrical cavity 72 which helps keep the coil spring in place. That recess may be omitted in the generality of the invention. Alternatively, button 32 may have other spring-end-engaging means, such as a small protuberance, although that would inhibit a preferred method of assembly of fitting 22, as described below. Another kind of compression spring may optionally be used in substitution of a coil spring. For example, leaf springs, torsional springs, elastomer cushion springs, or gas filled springs may be used, with one button having a recess to receive the alternative spring.

FIG. 12 and FIG. 13 are side views, with partial cross sectioning, of a coupling 20 of the present invention in combination with two end portions of shafts 26, 28 which the coupling connects for transmitting axial and torsional loads. FIG. 12 shows the buttons extended outwardly, so they engage the sleeve-like female end 38 of fitting 24. FIG.

13 shows the buttons pressed inwardly, so the button planar bases are in contact with each other and the button tops are recessed, so the fittings can be separated, to disconnect the coupling.

The shaft segments 26, 28 may be solid or hollow (as shown) and will attach to each fitting at ends 36, 40 in a choice of ways. For example the shaft-attached end of a fitting may be a sleeve like portion (as shown for end 40 in FIG. 13), and the shaft may be secured within the sleeve by means of a pin, screw, adhesive, or crimping. In another example, the fitting may have a proximal end which is reduced in diameter, or like a plug, that inserts within the lengthwise cavity of a hollow shaft.

FIG. 12-13 show that male stub end 34 comprises an end wall 80 that closes the cavity 56 at the distal end of the fitting 24. Wall 80 provides a planar surface 68 inside cavity 56, for guiding the lengthwise ends of the flanges 54 of the two buttons as they move radially in and out. Thus, the transverse-running surface 68 provides the buttons with resistance to movement when there is lengthwise thrusting apart of the coupling. That construction compares to a coupling having no surface 68, where the buttons only have support that is provided by the lengthwise ends of openings 33.

As described below, the proximal end of the fitting cavity 56 is preferably open, at least during the manufacturing process, to enable positioning of the buttons within the fitting. FIG. 12 shows plug 66 which has been optionally pushed into the proximal end of cavity 56 after placement of the buttons. The end of plug 66 provides a planar transverse-running support surface 62 for the proximal ends of the buttons 30, 32. Surface 62 facilitates the in-out motion of buttons, in cooperation with surface 68. Plug 66 may be held in place by hollow shaft 26, as illustrated. Other known means of securing the plug may be utilized. When a shaft 26 is solid, compared to the hollow shafts 26, 28 which are shown, a shaft end may be shaped to function as plug 66 and provide the surface 62. In an alternate embodiment of the invention, if may be sufficient to have no plug 66 and thus no surface 62, and to have only surface 68, with respect to guiding in-out motion against longitudinal forces on the coupler.

When the buttons are depressed, fitting 22 and fitting 24 may be disengaged. As illustrated in FIG. 13, as a result of typical manual squeezing action by a user's fingers, the buttons will be naturally centered within the fitting 22. In smaller diameter couplers especially, the bottom surfaces of depressed buttons will contact each other, or come very close to being in contact, to substantially the same effect.

Figure 15:
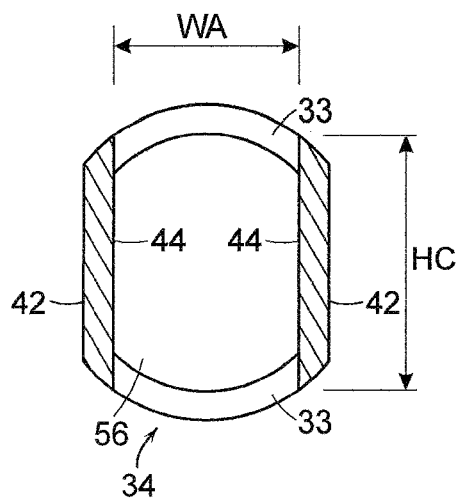
FIG. 15 is a transverse cross section of male stub portion of the fitting shown in FIG. 3 with the buttons and spring omitted.
Figure 16:
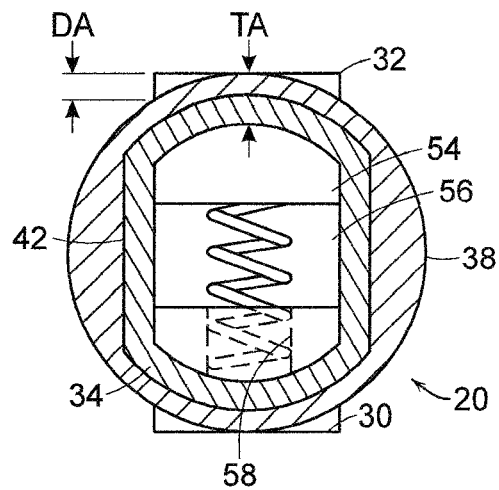
FIG. 16 is transverse cross section of the coupling shown in FIG. 12.

FIG. 15 is a cross section through the end 34 of fitting 22, shown in FIG. 2. FIG. 16 is a cross section through the coupling 20 in FIG. 12-13, showing how the fittings 22, 24 engage by means of outwardly-thrust buttons 30, 32. FIG. 15 shows that internal flats 44 are integral with the wall of end 34 and how they both are parallel to the internal surface flats 44.

When the fittings 22, 24 are mated so the end 34 fits within the cavity of end 38, as shown in FIG. 16, buttons 30, 32 project through the radial thickness TA of the adjacent circumferentially curved walls of end 38 and 34 (with addition of such clearance space as is present between the walls to enable good slip fit). The lateral edge of each button projects beyond the circumferentially curved exterior surface of the female stub end 38 of fitting 24 by a dimension DA. That extension and engagement compares with what may be found in prior art couplers, where there is a button that projects from a flat surface of the male stub (e.g., from flat 42). The good engagement of the whole of the button with the whole of the opening 46 in the end 38 makes coupler 20 less prone to inadvertent disengagement during rough handling.

The question of how the buttons are put in place within the body of fitting 22 is present. In one approach, not illustrated, the distal end portion of the fitting might be made of multiple pieces. For example, the end wall could be a cover which is threaded, welded, or otherwise attached to the circumferential side wall of the end, to provide a closable access opening. Preferably, fitting 22 and the buttons are configured in accord with the drawings here, and the fitting may be constructed as now described.

Figure 14:
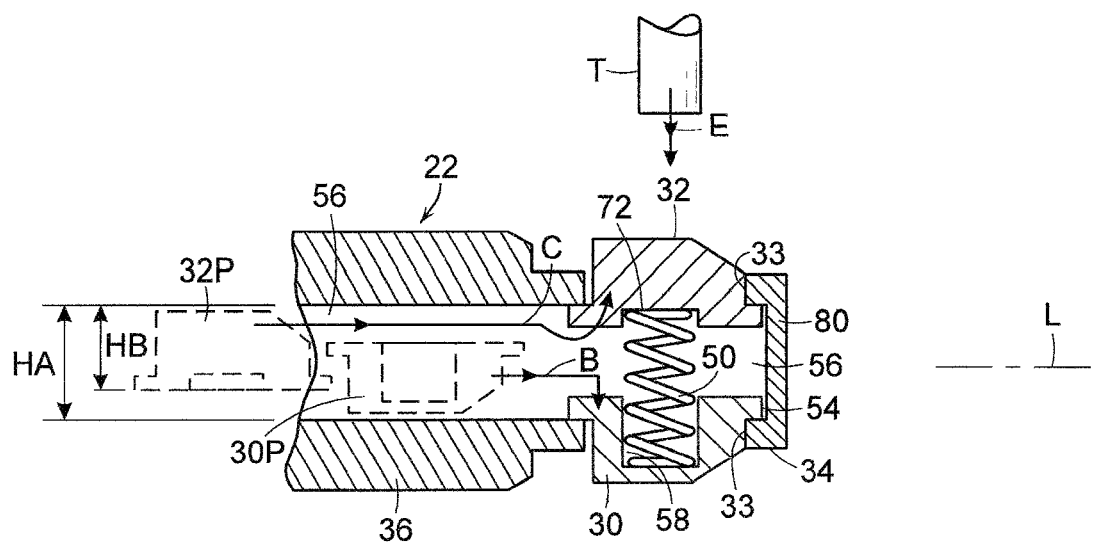
FIG. 14 is a lengthwise view of a coupling, with a partial cross section, showing how the buttons are installed during the manufacturing process.

FIG. 14 is of the same kind of drawing as FIG. 12, with the omission of fitting 24, i.e. it is a lengthwise cross section of the body of fitting 22, showing the buttons and spring without sectioning. FIG. 14 illustrates how the unique features of the interior 56 and the buttons enable the buttons to be inserted into a fitting 22 which has a wall 80 that closes off the end of cavity 56. First, the button 30 having the deep bore for the coil spring 50 is slid into the open (proximal) end of cavity 56. As shown in FIG. 14 by phantom button 30P and arrow B, button 30P is moved lengthwise along cavity 56, until it reaches lower opening 33 and drops into the opening. Button 30 is shown in place as a result of that step, in FIG. 14. Spring 50 is either pressed into cylindrical cavity (pocket) 58 at the beginning of the foregoing step, or it is dropped through the second opening 33 into the cavity 58, to the same effect.

Then, spring 50 is pressed downwardly by tool T and shown by the associated arrow E. While the spring is being held compressed in cavity 58, the second button 32 is moved into position, as indicated by phantom button 32P and the associated arrow C in FIG. 14. Button 32 is slid onto and over the flange-bottom of button 30 and the spring is in its compressed position. Tool T is simultaneously slid laterally out of the way as button 32 slides over the compressed spring. Then tool T is withdrawn. The second button 32 will then be pushed by the spring 50 upwardly into upper opening 33, as shown in FIG. 14. It will be appreciated from the foregoing why it is quite desirable that the cylindrical cavity 58 of button 30 should be sufficient in depth to hold the whole of the spring. Less preferably, a small portion, e.g., 10% or less, of the spring may project from the cavity 58, and the invention can still be carried out. As explained above, having a cavity 58 of the foregoing depths is also important regardless of the advantage of the assembly method which has been just described; the deep cavity enables a spring which is stronger and longer, and therefore better.

After the buttons are put in place, with reference now to FIG. 12, plug 60 may be pushed into place from the proximal end of fitting 22, to seal off cavity 56. Plug 60 may be held in place by press fit, tack weld, set screw, adhesive, or other means.

Because spring 50 is able to be compressed into the cavity 58 of button 30, each button has a maximized height HB and thus will be in good contact with the interior sidewalls of cavity 56 during in-out movement, and thus the tendency for a button to wobble is minimized.

Figure 11:
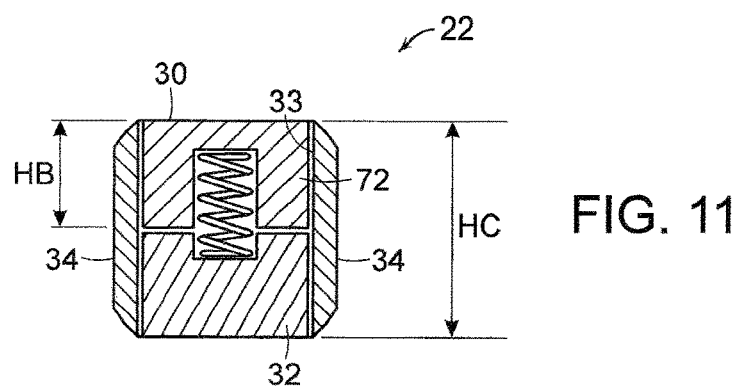
FIG. 11 is a transverse cross section like that of FIG. 10, showing the buttons pushed inwardly.

With reference to FIGS. 8, 11, 13 and 14, preferably the buttons 30, 32 each have a height dimension HB which is about half of the height HC of the space in which the buttons travel, measured at the button lengthwise edge location. When that is the case, when the buttons are fully pushed inwardly, the bases of the buttons will contact each other, as shown in FIG. 11.

With reference to FIG. 14: Preferably, the height HA of the proximal end opening of cavity 56 is greater than the height HB of a button but less than twice the dimension HC (shown in FIG. 11). Considering the button 32P, a button might have a height HB which is as large as the dimension HA, less the thickness of the flange of a button.

Figure 17:
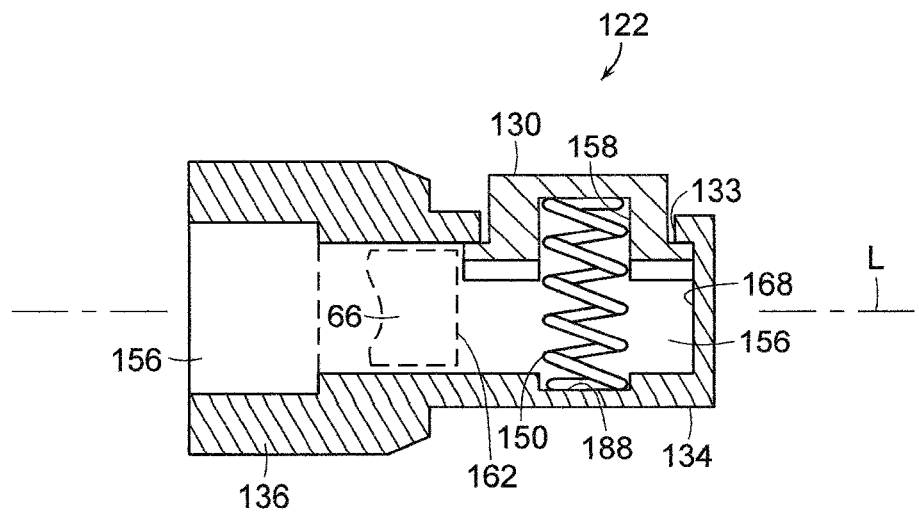
FIG. 17 is a lengthwise cross section of a one fitting of the two fittings which comprise a single button coupler.

The method of assembling a single button fitting like fitting 122 shown in FIG. 17 is similar to that which has been just described for the two-button fitting, with the obvious difference. In short, the button is slid into the cavity 156 from the proximal end of the fitting, while spring 150 is compressed into cavity 158, and after the button has been urged by the spring into the opening 133, plug 66 is inserted to provide guiding surface 162.

The method of installing buttons may be carried out in an alternative procedure as follows, with reference to FIG. 14a which is of the same kind as FIG. 14. The button 32 is first slid into the cavity 56 through the opening in the proximal end and put into one of the openings 33 in the distal end of fitting 22. Then a ramp 77, such as a thin piece of metal, is inserted in the proximal end and laid on top of button 32. The spring 50 is compressed within the cavity in the base of button 30 by pressing the button downwardly on the ramp surface while moving button 30 along the ramp, into the cavity 56 and into the second opening 33 as indicated by the arrows CC, at which time the spring expands. Then the ramp is removed by pulling lengthwise.

Figure 14A:
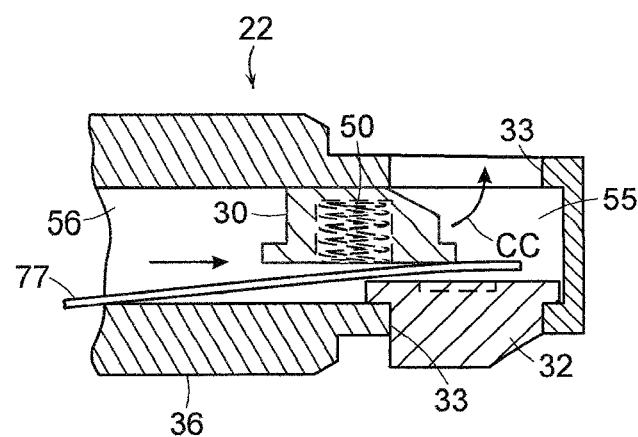
FIG. 14A is a view like FIG. 13, showing an alternative way of installing the buttons.

With reference to FIG. 14A, and in contrast to FIG. 14. When buttons are installed in accord with FIG. 14A, the (maximum) height HB of a button is about equal to one half of the height HA of the opening 56 with the thickness of the ramp being taken into account.

Height HA of the proximal end opening of cavity 56 is greater than the height HB of a button but less than twice the dimension HC (shown in FIG. 11). Considering the button 32P, a button might have a height HB which is as large as the dimension HA, less the thickness of the flange of a button.

While couplers having two buttons are desirable for the reasons stated, in very small couplers it can become difficult to fit the two buttons in a coupler while also having buttons of sufficient size to manipulate manually. FIG. 17 shows another embodiment of fitting 122 which may be used with an unshown fitting that is like fitting 24, but which has only one opening 46. Fitting 122 comprises distal end 134, proximal end 156, and internal cavity 156. Button 130 moves in-out within cavity, passing through wall opening 133. Spring 150 fits within cavity 158 of button 130 and is stabilized in position by small recess 188 on the interior of the wall which comprises end 134. As with the two-button couplers, preferably the depth of cavity 158 is sufficient substantially to receive a fully compressed spring 150, for achieving the same kinds of benefits as described above for coupler 20, with respect to spring length and assembly.

Other than having only one button, a preferred coupler comprising fitting 122 has features similar to those described for fitting 24 of coupler 20, and its variations. For example, the button 130 of a preferred one-button coupler fits within the interior cavity 156 of fitting 122, and is guided during in-out motion by surfaces 168 and 162 at the distal and proximal ends of the button, and by side flats within cavity 156 that contact the flat sides of the button, in the same way as has been described for button 32. And the flats on the interior and exterior of the distal end of fitting 122 are parallel to each other.

A coupler of the present invention has unique and advantageous features: The coupler has buttons having good amounts of outward projection, for good engagement when the fittings of the coupler are mated. The buttons are strong where they engage both the mating female part and the interior of the male part. The buttons are of sufficient size to enable good finger manipulation, especially in small diameter couplers. The spring is strong and the buttons move in-and out even when there is debris or loads on the coupling.

The invention, with explicit and implicit variations and advantages, has been described and illustrated with respect to several embodiments. Those embodiments should be considered illustrative and not restrictive. Any use of words such as "preferred" and variations suggest a feature or combination which is desirable but which is not necessarily mandatory. Thus embodiments lacking any such preferred feature or combination may be within the scope of the claims which follow. Persons skilled in the art may make various changes in form and detail of the invention embodiments which are described, without departing from the spirit and scope of the claimed invention.

What is claimed is:

1. A coupler, for releasably interconnecting two shafts, having a length and a diameter, comprising a first fitting and a releasably engageable second fitting, wherein
   (a) the first fitting has an exterior surface and a lengthwise axis; and comprises
      a proximal end shaped for attachment to a first shaft; a distal end configured for releasable engagement of the first fitting with at the second fitting; a cavity having opposing side lengthwise-extending parallel planar sidewalls within; two opposing side openings connecting the cavity to the exterior surface, each side opening having parallel opposing side lengthwise edges; wherein each planar sidewall is aligned with and continuous with at least one of said lengthwise edges of at least one of said side openings;
      a first button and a second button, captured within said cavity, each button movable inwardly and outwardly within one of said side openings,
      each button having
         a top,
         a base facing toward the interior of the cavity,
         a distal end flange and an opposing proximal end flange, for preventing the base of the button from exiting the cavity through one of said side openings, and
         opposing lengthwise parallel planar side surfaces extending from the base to the top;
      wherein the first button has a pocket in the base, the pocket having a depth;
      wherein the second button has either a base which is flat or a base which comprises a recess having a depth, which recess depth is substantially smaller than the pocket depth;
      a spring having a length, for urging the buttons apart, wherein when the spring is fully compressed the substantial whole of the length of the spring is contained within said pocket; and,
   (b) the second fitting has an exterior surface and a lengthwise axis and comprises a proximal end shaped for attachment to a second shaft; a distal end having a cavity with an end opening, said cavity shaped to receive at said end opening at least a portion of the distal end of the first fitting; two opposing side openings connecting the cavity to the exterior surface of the second fitting;
      wherein each side opening has parallel opposing lengthwise sides; wherein, when the distal ends of the first fitting and the second fitting are mated so the fittings form a coupler, the buttons are movable outwardly and inwardly within the side openings of the second fitting, respectively to enable lengthwise and torsional engagement and disengagement of the first fitting and second fitting; and wherein the bases of the buttons contact each other when the buttons are pushed inwardly sufficiently to enable disengagement of the fittings.

2. The coupler of claim 1 wherein the exterior surface of the first fitting is at least part-circular and has at least one lengthwise-extending feature at the distal end thereof; and wherein the cavity of the second fitting has a mating lengthwise-extending feature; so that when the first fitting and the second fitting are mated said lengthwise-extending features cooperate for preventing rotation of the distal end of the first fitting within the cavity of the second fitting.

3. The coupler of claim 2 wherein said at least one lengthwise-extending feature of the first fitting is a flat that is parallel to said lengthwise-extending parallel planar sidewalls within the cavity of the first fitting.

4. The coupler of claim 3 wherein the first fitting has two opposing side flats.

5. The coupler of claim 1 wherein the first fitting further comprises:
a planar surface at the distal end of the cavity, the planar surface extending perpendicularly to the lengthwise axis of the first fitting, for guiding the distal end flange of each button during in and out movement of the button.

6. The coupler of claim 5 further comprising a plug, positioned within the first fitting cavity, the plug providing a planar surface for guiding the proximal end flange of each button during in and out movement of the button.

7. The coupler of claim 1 wherein the second button has a recess in the base thereof, wherein a portion of the spring length is positioned in said recess.

8. The coupler of claim 1, wherein when said first fitting and said second fitting are mated and each button has moved outwardly maximally, a portion of the top of at least one button projects beyond the exterior surface of the second fitting.

9. The coupler of claim 1 wherein the spring is a coil spring.

10. A coupler, for releasabiy interconnecting two shafts, the coupler comprising a first fitting and a releasably engageable second fitting, the coupler having a length, a length axis, and a diameter, wherein
(a) the first fitting has an exterior surface with a part-circular portion, a lengthwise axis, and at least one lengthwise extending flat feature and comprises
a proximal end shaped for attachment to a first shaft; a distal end configured for releasable engagement of the first fitting with the second fitting; a cavity; two opposing side openings connecting the cavity to the exterior surface, each side opening having parallel opposing lengthwise edges; opposing side lengthwise planar sidewalls within the cavity, wherein each planar sidewall is aligned with the lengthwise ,edge of one of the side openings;
a first button and a second button captured within said cavity each button movable inwardly and outwardly within one of said side openings,
each button having
a top,
a base facing toward the interior of the cavity,
a distal end flange and an opposing proximal end flange, for preventing the base of the button from exiting the cavity through a side opening,
opposing lengthwise parallel planar side surfaces extending from the base to the top, each said surface in contact with one of said opposing side planar sidewalls,
wherein each button moves inwardly and outwardly within a side opening; the first button having a pocket in the base, the pocket having a first depth;
wherein the second button either has a base which is flat or has a base with a recess having a second depth, which second depth is substantially smaller than the first depth;
a spring, having a length, positioned within said pocket for urging the buttons outwardly within said side openings, the spring running from within said pocket to said flat base or said recess; and
(b) the second fitting has an exterior surface and comprises a proximal end shaped for attachment to a second shaft, a distal end having a cavity with an end opening and two opposing side openings that connect the cavity to the exterior surface of the second fitting, wherein each opposing side opening has parallel opposing lengthwise edges, and wherein the cavity has an interior surface shaped to mate lengthwise with the part-circular portion exterior surface and with the at least one lengthwise extending flat feature of the first fitting;
wherein, when the first fitting is mated with the second fitting to form a coupler, the buttons are movable outwardly and inwardly within the side openings of the second fitting, to enable alternately lengthwise and torsional engagement and disengagement of the first and second fittings; and
wherein the bases of the buttons contact each other when the buttons are pushed inwardly sufficiently to enable disengagement of the fittings.

11. The coupler of claim 10 wherein the length of the spring substantially fills said pocket when the spring is fully compressed.

12. A coupler, for releasably interconnecting two shafts, having a length and a diameter, the coupler comprising a first fitting and a releasably engageable second fitting, wherein
(a) the first fitting has a proximal end shaped for attachment to a first shaft;
a distal end having a cavity and an exterior surface configured for releasable engagement with the second fitting and a cavity;
at least one side opening connecting the cavity to the exterior surface, the at least one side opening having parallel opposing lengthwise edges;
opposing side lengthwise planar sidewalls within said cavity, each planar sidewall is aligned with one of said lengthwise edges of the at least one side opening;
at least one button, captured within the cavity and movable inwardly and outwardly within said at least one side opening,
the at least one button having
a top,
a base facing toward the interior of the cavity, the base having a pocket for receiving a spring, the pocket having a depth,
a distal end flange and an opposing proximal end flange, for preventing the base of the at least one button from exiting the cavity through the at least one side opening, opposing lengthwise parallel planar side surfaces extending from the base to the top; and, a spring, having a length which is variable, positioned within said pocket, for urging the at least one button outwardly through the at least one side opening, the spring length substantially filling said pocket when the spring is fully compressed;

(b) the second fitting has a lengthwise axis, a proximal end shaped for attachment to a second shaft; a distal end having a cavity with an end opening, and an exterior surface portion, at least one side opening that connects the cavity to said exterior surface portion; wherein said at least one side opening has parallel opposing lengthwise edges;

wherein, when the first fitting is mated with the second fitting to form a coupler, the at least one button is movable outwardly and inwardly within the at least one side opening of the second fitting, alternately to enable lengthwise engagement and disengagement of the first fitting and second fittings:

wherein the exterior surface of the first fitting is part-circular and comprises at least one lengthwise-extending feature for preventing rotation of the distal end of the first fitting within the cavity of the second fitting; and wherein the second fitting has a mating lengthwise-extending feature within the cavity thereof;

wherein the first fitting has two said at least one lengthwise-extending features, said features comprising opposing side flat surfaces that are parallel to the lengthwise planar surfaces within the cavity of the first fitting and wherein the at least one side o enin is formed in the art-circular ortion of the exterior surface of the first fitting.

13. The coupler of claim 12 wherein the top of the at least one button projects from the exterior surface portion of the distal end of the second fitting when the first fitting and the second fitting are mated.

14. The coupler of claim 12 wherein the first fitting further comprises:

a planar surface at the distal end of the cavity, for guiding the distal end flange of the at least one button during in and out movement of the button; and, a planar surface at the proximal end of the cavity, for guiding the proximal end flange of the at least one button during in and out movement of the button.

15. The coupler of claim 12, wherein the length of the fully compressed spring is between 90 percent and 110 percent of the depth dimension of said pocket.

16. The coupler of claim 12 wherein the spring is a coil spring.

17. The coupler of claim 12 wherein the first fitting has a second side opening like the at least one side opening, the second side opening opposing the at least one side opening; the coupler further comprising: a second button having a top, distal end flange, proximal end flange, and opposing lengthwise planar surfaces, all like those of the at least one button; the second button having a base facing toward the cavity and positioned for inward and outward movement within the second side opening; wherein each button base is planar except for any portion which comprises a pocket or recess.

18. The coupler of claim 17 wherein the base of the second button has a recess for receiving an end of the spring, the recess having a depth which is a small fraction of the depth of the pocket of the first button.

\* \* \* \* \*

UNITED STATES PATENT AND TRADEMARK OFFICE
CERTIFICATE OF CORRECTION

PATENT NO. : 10,288,123 B2
APPLICATION NO. : 14/810172
DATED : May 14, 2019
INVENTOR(S) : Gregory Lee Newth It is certified that error appears in the above-identified patent and that said Letters Patent is hereby corrected as shown below:

In the Claims

Column 13, Lines 33-34, In Claim 12, delete "o enin is formed in the art-circular ortion" and insert --opening is formed in the part-circular portion--

Signed and Sealed this
Thirteenth Day of August, 2019

Andrei Iancu
*Director of the United States Patent and Trademark Office*